(No Model.)
J. LEDERLE & L. OBERLEIN.
Beer Cooler.
No. 234,133. Patented Nov. 9, 1880.
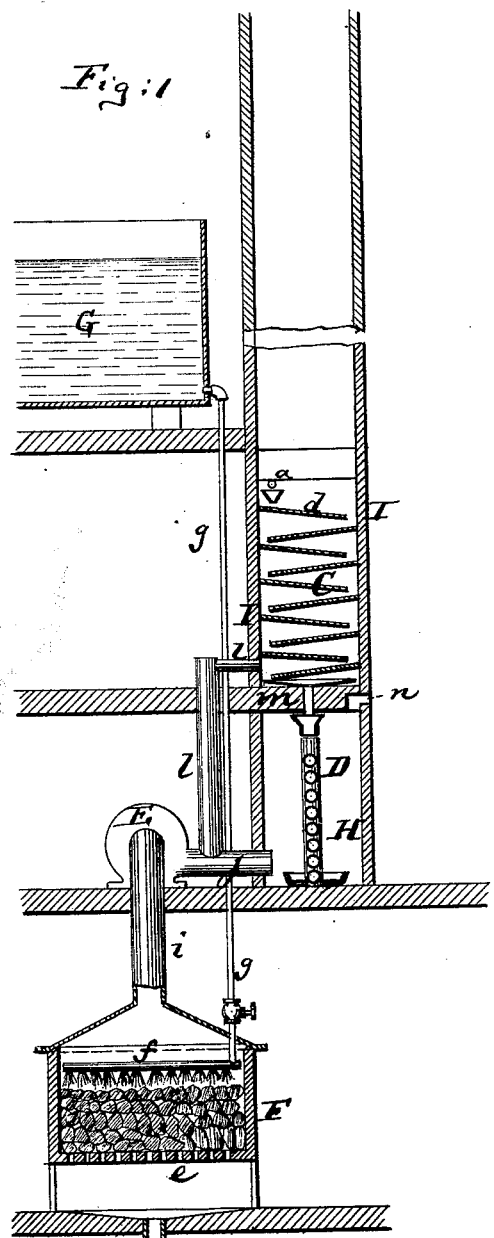
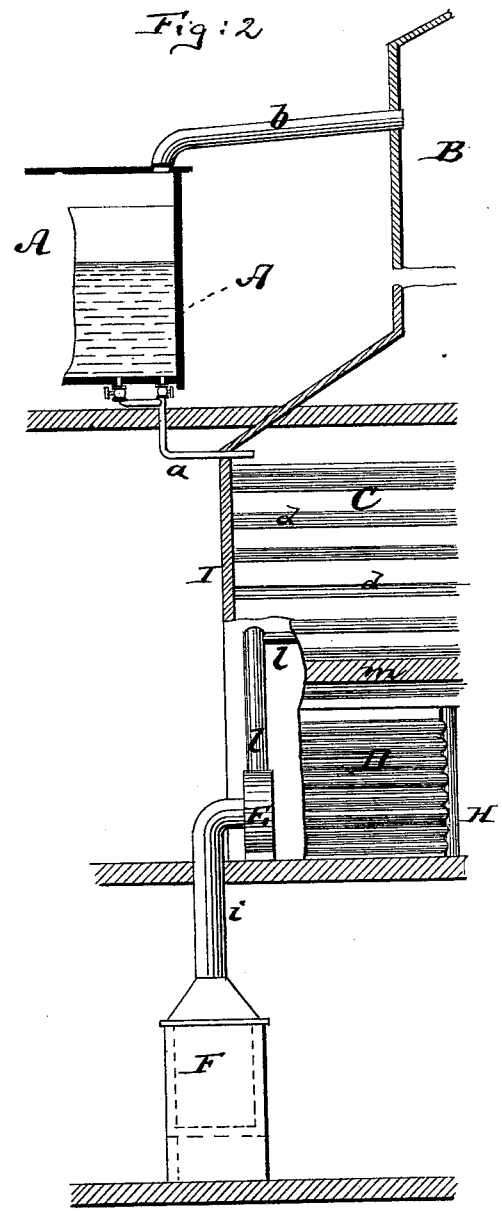
Witnesses:
John C. Tunbridge.
Harry M. Turk.
Inventors:
Joseph Lederle
Ludwig Oberlein
by their attorney
A. v. Briesen

UNITED STATES PATENT OFFICE.

JOSEPH LEDERLE, OF EDGEWATER, AND LUDWIG OBERLEIN, OF NEW YORK, N. Y.

BEER-COOLER.

SPECIFICATION forming part of Letters Patent No. 234,133, dated November 9, 1880.

Application filed July 1, 1880. (No model.)

*To all whom it may concern:*

Be it known that we, JOSEPH LEDERLE, of Edgewater, in the county of Richmond and State of New York, and LUDWIG OBERLEIN, of the city, county, and State of New York, have invented a new and Improved Apparatus for Cooling Beer, of which the following is a specification.

Figure 1 represents a sectional elevation of our improved apparatus for cooling beer; and Fig. 2 is a vertical cross-section, partly in elevation, of the same.

This invention relates to a new combination of conduits, coolers, and ventilator or air-forcing apparatus for cooling the beer on its way from a tank to the fermenting-vat, so as to prevent it from coming in contact with any but positively purified air, and bring it in contact, under the most favorable circumstances, with positively purified air; to which end the invention consists in the novel combination of parts hereinafter more fully specified.

In the drawings, A represents a beer vat or tank, which contains the beer in a boiling condition. This tank is closed air-tight except where it is provided with an outlet, $a$, for the escape of the beer to the cooling apparatus, and where it is joined on top to the pipe $b$, which conducts the steam ascending from the boiling contents into a suitable chimney, B, so that thus the external atmosphere containing injurious germs and contaminating matter is excluded from contact with the beer from the tank A.

The beer flows through the pipe $a$ into the counter-current cooler C, which is a cooler composed of a series of inclined plates, $d\,d$, so set as to receive and deliver the beer in thin strata and expose the same while it flows downward to upwardly-ascending currents of purified air. The cooler C is built up between walls in a chamber, I, so that the air which the beer meets within the said chamber will only come from the source intended, which is the source that we will hereinafter more fully refer to. From the counter-current cooler C the beer flows into a Bondelôt or other equivalent cooler, D, which likewise is contained within a chamber, H, receiving none but purified air, and from which the beer finally flows into the fermenting-vat, or to whatever place may be provided for its reception.

Having now described the course of the beer, we will explain the course of the air. The air is propelled, contrary to the direction of the beer, through the coolers D and C by means of a suitable fan or air-propelling apparatus, E, which takes its supply of air from the purifier-box F. This box contains coal broken into more or less minute pieces and lying on a perforated grate-like bottom, $e$. Water is sprinkled continuously by a sprinkler-pipe, $f$, upon the coal, the source of water being preferably an elevated tank, G, having a pipe, $g$, that discharges its contents into the sprinkler-pipe $f$. The fan E draws the air through a supply-pipe, $i'$, from the purifier-box F and discharges it through one branch, $j$, into the chamber H, containing the cooler D, and through another branch, $l$, into the chamber I, containing the cooler C. All the air taken by the fan E must pass through the moistened stratum of coal in the purifier-box F, whereby it is thoroughly cooled and also deprived of all impurities, it being well known, and not part of our invention, that moistened strata of coal constitute the best air-filter, or one of the best air-filters, known to the art, and at the same a superior means of cooling the air. The air thus purified is, as already stated, propelled into chambers containing the two coolers—that is to say, into the lower ends of said chambers, respectively—the two chambers being separated by a partition, $m$, so that the air passing into the chamber H, that contains the cooler D, will pass upward in a contrary direction to the attenuated stream of beer, and then escape to a suitable chimney or passage, $n$. The air propelled through the tube $l$ into the chamber I, that contains the cooler C, passes in zigzag order between the several shelves or inclined plates $d\,d$ in a direction counter to that of the beer, so that thus, by the two separate supply sources of the air leading to two separate chambers, the beer is, at different stages of its descent, exposed to the cooling influence of pure air; whereas, heretofore in such apparatus the air with which the beer was brought in contact was charged with germs and impurities and liable to do more harm by its contact with the liquid than it did good by causing the discharge of surplus heat.

We do not wish to limit ourselves to any specific form of cooler, nor to any specific number of coolers used in the apparatus, for one cooler might answer in one apparatus, though we prefer a series for obvious reasons.

We claim—

The combination, in an apparatus for cooling beer, of the tank A, having the steam-escape pipe $b$ and discharge-pipe $a$, with a cooler or coolers and with air-propelling apparatus E, and air-purifying apparatus F, and with walls to inclose each cooler, all arranged as described, whereby the beer on its way to and over the coolers will come in contact only with the air that is passed through the purifying apparatus F, substantially as specified.

JOSEPH LEDERLE.
LUDWIG OBERLEIN.

Witnesses:
HARRY M. TUCK,
WILLY G. E. SCHULTZ.